United States Patent
Ebner et al.

(10) Patent No.: US 10,352,166 B2
(45) Date of Patent: *Jul. 16, 2019

(54) CUTTING APPARATUS AND METHOD OF OPERATING

(71) Applicant: SANDVIK INTELLECTUAL PROPERTY AB, Sandviken (SE)

(72) Inventors: Bernhard Ebner, Knittelfeld (AT); Hubert Kargl, Gaal (AT)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 83 days.

This patent is subject to a terminal disclaimer.

(21) Appl. No.: 15/516,642

(22) PCT Filed: Oct. 2, 2015

(86) PCT No.: PCT/EP2015/072847
§ 371 (c)(1),
(2) Date: Apr. 3, 2017

(87) PCT Pub. No.: WO2016/055382
PCT Pub. Date: Apr. 14, 2016

(65) Prior Publication Data
US 2017/0306758 A1 Oct. 26, 2017

(30) Foreign Application Priority Data
Oct. 6, 2014 (WO) .................. PCT/EP2014/071334

(51) Int. Cl.
*E21D 9/10* (2006.01)
*E21C 27/24* (2006.01)
(Continued)

(52) U.S. Cl.
CPC ............ *E21D 9/1013* (2013.01); *E21C 25/06* (2013.01); *E21C 25/18* (2013.01); *E21C 27/24* (2013.01);
(Continued)

(58) Field of Classification Search
CPC .......... E21C 27/10; E21C 27/14; E21C 27/16; E21C 27/24; E21D 9/1013; E21D 9/102; E21D 9/1026; E21D 9/1033
See application file for complete search history.

(56) References Cited

U.S. PATENT DOCUMENTS 3,663,054 A 5/1972 Dubois
3,995,907 A * 12/1976 Dubois ................. E21D 9/1093
299/31
(Continued)

FOREIGN PATENT DOCUMENTS

CN 103732859 A 4/2014
CN 203948095 U 11/2014
(Continued)

*Primary Examiner* — David J Bagnell
*Assistant Examiner* — Michael A Goodwin
(74) *Attorney, Agent, or Firm* — Corinne R. Gorski

(57) ABSTRACT

A cutting apparatus suitable for creating tunnels and subterranean roadways includes independently pivoting supports that each carry a respective, independently pivoting arm and a rotatable cutting head. Each cutting head, via the supports and arms, is configured to slew laterally outward in a sideways direction and to pivot in a vertical upward and downward direction. The supports and arms are mounted on a linear moving sled carried by a main frame.

14 Claims, 11 Drawing Sheets

(51) Int. Cl.
*E21C 25/18* (2006.01)
*E21C 29/22* (2006.01)
*E21C 35/06* (2006.01)
*E21D 20/00* (2006.01)
*E21C 25/06* (2006.01)
*E21C 35/08* (2006.01)
*F16H 57/023* (2012.01)
*F15B 11/16* (2006.01)

(52) U.S. Cl.
CPC .............. *E21C 29/22* (2013.01); *E21C 35/06* (2013.01); *E21C 35/08* (2013.01); *E21D 9/1026* (2013.01); *E21D 9/1033* (2013.01); *E21D 9/1093* (2013.01); *E21D 20/003* (2013.01); *F15B 11/16* (2013.01); *F16H 57/023* (2013.01); *F16H 2057/0235* (2013.01)

(56) References Cited

U.S. PATENT DOCUMENTS

| | | | | |
|---|---|---|---|---|
| 4,548,442 | A * | 10/1985 | Sugden | E21D 9/10 299/10 |
| 4,838,615 | A * | 6/1989 | Oldham | E21C 25/16 173/42 |
| 4,884,848 | A * | 12/1989 | Wrulich | E21C 47/10 299/73 |
| 5,192,116 | A * | 3/1993 | Turner | E21D 9/1013 299/31 |
| 7,182,407 | B1 * | 2/2007 | Peach | E21C 25/16 299/75 |
| 8,690,262 | B2 | 4/2014 | Ebner et al. | |
| 2003/0230925 | A1 | 12/2003 | Oishi | |
| 2005/0200192 | A1 * | 9/2005 | Sugden | E21C 25/16 299/75 |
| 2010/0314931 | A1 * | 12/2010 | Ebner | E21C 27/24 299/33 |
| 2017/0298730 | A1 * | 10/2017 | Brandl | C01B 33/035 |
| 2018/0216460 | A1 * | 8/2018 | Ebner | E21C 27/24 |

FOREIGN PATENT DOCUMENTS

| | | |
|---|---|---|
| DE | 2656703 A1 | 6/1978 |
| DE | 202011050143 U1 | 10/2012 |
| EP | 0225079 A1 | 6/1987 |
| GB | 2124407 A | 2/1984 |
| WO | 02/066793 A1 | 8/2002 |
| WO | 03/089761 A1 | 10/2003 |
| WO | 2010050872 A1 | 5/2010 |
| WO | 2011093777 A1 | 8/2011 |
| WO | 2012156841 A2 | 11/2012 |
| WO | 2012156842 A2 | 11/2012 |
| WO | 2012156843 A2 | 11/2012 |
| WO | 2012156884 A2 | 11/2012 |
| WO | 2014090589 A2 | 6/2014 |

* cited by examiner

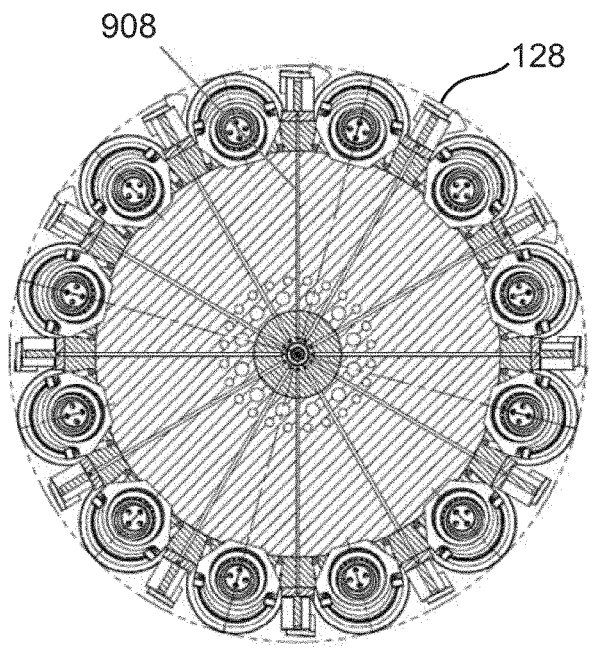
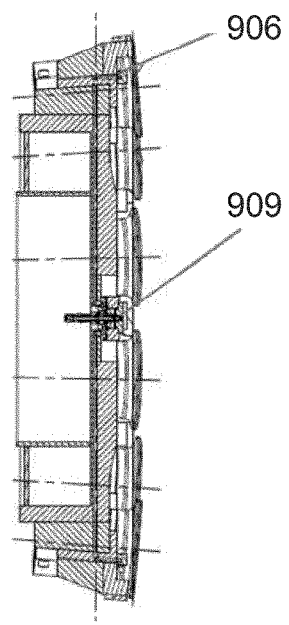
FIG. 13    FIG. 14
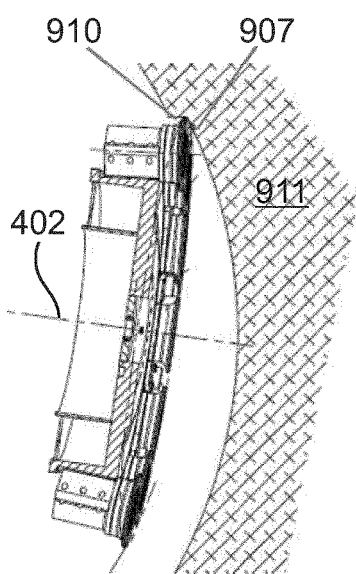
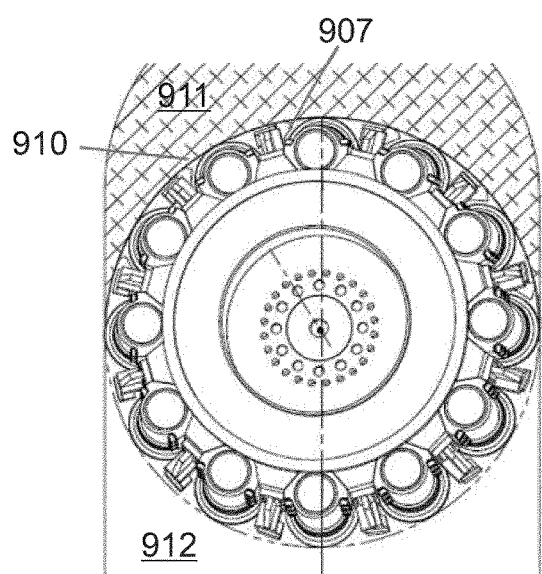
FIG. 15    FIG. 16

CUTTING APPARATUS AND METHOD OF OPERATING

RELATED APPLICATION DATA

This application is a § 371 National Stage Application of PCT International Application No. PCT/EP2015/072847 filed Oct. 2, 2015 claiming priority of EP Application No. PCT/EP2014/071334, filed Oct. 6, 2014.

FIELD OF INVENTION

The present invention relates to rock cutting apparatus suitable for creating tunnels or subterranean roadways and in particular, although not exclusively, to undercutting apparatus in which a plurality of rotating heads are capable of being slewed laterally outward and raised in the upward and downward direction during forward cutting. The invention also relates to a method of operating such cutting apparatus.

BACKGROUND ART

A variety of different types of excavation machines have been developed for cutting drifts, tunnels, subterranean roadways and the like in which a rotatable head is mounted on an arm that is in turn movably mounted at a main frame so as to create a desired tunnel cross sectional profile. WO2012/156841, WO 2012/156842, WO 2010/050872, WO 2012/156884, WO2011/093777,DE 20 2011 050 143 U1. All described apparatus for mill cutting of rock and minerals in which a rotating cutting head forced into contact with the rock face as supported by a movable arm. In particular, WO 2012/156884 describes the cutting end of the machine in which the rotatable heads are capable of being raised and lowered vertically and deflecting in the lateral sideways direction by a small angle in an attempt to try enhance the cutting action.

WO 2014/090589 describes a machine for digging roadways tunnels and the like in which a plurality of cutting heads are movable to dig into the rock face via a pivoting arcuate cutting path. US 2003/0230925 describes a rock excavator having a cutter head mounting a plurality of annular disc cutters suitable to operate in an undercutting mode.

It has been observed that it is desirable to allow for a flexibility in regard of the profile of the created tunnel, subterranean roadway or the like, preferably nor only term of width and/or height but also in terms of the shape. Additionally, there is a desire for a smooth or level floor.

Furthermore, it has been observed that conventional cutting machines are not optimised to cut hard rock having a strength typically beyond 120 MPa whilst creating a tunnel or subterranean cavity safely and reliably of desired cross sectional configuration. Accordingly, what is required is a cutting machine that addresses these problems.

SUMMARY OF THE INVENTION

It is an objective to provide a cutting apparatus or machine and a method of operating such cutting apparatus or machine allowing for an advantageous flexibility in terms of width, height and/or shape of the profile to be cut.

It is a further objective of the present invention to provide a cutting machine suitable to form tunnels and subterranean roadways being specifically configured to cut hard rock beyond 120 MPa in a controlled and reliable manner. It is a further specific objective to provide a cutting machine capable of creating a tunnel with a variable cross sectional area within a maximum and a minimum cutting range. It is a further specific objective to provide a cutting (excavator) machine operable in an 'undercutting' mode according to a two stage cutting action.

The objective of flexibility is achieved by providing a cutting apparatus suitable for creating tunnels or subterranean roadways and the like comprising a main frame having regions generally facing in a first direction, a second direction opposite to the first direction and a third direction perpendicular to the first and second direction and to a lengthwise direction, a first and a second arm each pivotally mounted via a respective arm pivot axis aligned in a direction extending transverse including perpendicular to the first and second direction to enable the first and second arms to pivot independently of one another in the first and second direction, at least one first and second arm actuator to actuate independently pivoting movement of the first and second arms relative to the main frame, and a rotatable cutting head mounted at each of the first and second arms. Specifically, the first direction may be an upwards direction with the second direction being a downwards direction and the third direction being a side facing direction, resulting in a cutting apparatus suitable for creating tunnels or subterranean roadways and the like comprising a main frame having generally upward, downward and side facing regions, a first and a second arm each pivotally mounted via a respective arm pivot axis aligned in a direction extending transverse including perpendicular to a generally upright direction relative to the upward and downward facing regions to enable the first and second arms to pivot independently of one another in an upward and downward direction relative to the upward and downward facing regions, at least one first and second arm actuator to actuate independently pivoting movement of the first and second arms relative to the main frame, and a rotatable cutting head mounted at each of the first and second arms.

In the following, for ease of understanding, mostly referral is made to the case that the first and second direction are upwards and downwards, with the third direction being sideways. It is, however, to be understood that thus referrals are exemplary also for other arrangements, including, for example, a situation where the first and second direction horizontal, with the third direction being vertical, as long it is not apparent from the context that only the specifically indicated direction may apply.

In this context, the invention further provides for a method of operating a cutting apparatus for creating tunnels or subterranean roadways and the like, wherein the cutting apparatus comprises a main frame having regions generally facing in a first direction, a second direction opposite to the first direction and a third direction perpendicular to the first and second direction and to a lengthwise direction, a first and a second arm each pivotally mounted via a respective arm pivot axis aligned in a direction extending transverse including perpendicular to a first and second direction to enable the first and second arms to pivot independently of one another in first and second direction, at least one first and second arm actuator to actuate independently pivoting movement of the first and second arms relative to the main frame, and a rotatable cutting head mounted at each of the first and second arms, wherein the method comprises a positioning step of pivoting the first and second arm in the second direction such that each cutting head is tilted forward by a sump-in-angle with respect to a sump-in plane with a forwardmost edge of the cutting head being further in the second direction than its rearwardmost edge, and a cutting step including pivoting the first arm and pivoting the second arm while rotating the cutting head and engaging the rotating cutting head into a rock face. Specifically, as mentioned above, the first direction may be an upwards direction with the second direction being a downwards direction and the third direction being a side facing direction, resulting in a method of operating a cutting apparatus for creating tunnels or subterranean roadways and the like, wherein the cutting apparatus comprises a main frame having generally upward, downward and side facing regions, a first and a second arm each pivotally mounted via a respective arm pivot axis aligned in a direction extending transverse including perpendicular to a generally upright direction relative to the upward and downward facing regions to enable the first and second arms to pivot independently of one another in an upward and downward direction relative to the upward and downward facing regions, at least one first and second arm actuator to actuate independently pivoting movement of the first and second arms relative to the main frame, and a rotatable cutting head mounted at each of the first and second arms, wherein the method comprises a positioning step of pivoting the first and second arm in a downwards direction such that each cutting head is tilted forward by a sump-in-angle with respect to a floor plane with a forwardmost edge of the cutting head being lower than its rearwardmost edge, and a cutting step including pivoting the first arm and pivoting the second arm while rotating the cutting head and engaging the rotating cutting head into a rock face.

Preferably, each of the rotatable cutting heads mounted to the first and second arms is rotatable about a respective head axis orientated to extend substantially transverse to each respective arm pivot axis, wherein the head axis is offset by a predetermined offset amount from a plane defined by the arm pivot axis and a line parallel to the head axis, wherein the head axis is offset towards a forward direction with the arm being positioned in the second direction (e.g. the downwards direction). The offset of the head axis may also be described such that there is a predetermined and preferably fixed perpendicular distance (being non zero) between a line defined by the arm pivot axis and a line defined by the head axis. Furthermore, it is to be understand that the direction of the offset as such changes with the direction of the arm, e.g. as the head axis is offset upwards if the arm is oriented substantially horizontally and is even offset backwards if the arm is oriented upwards. Considering a basic operation of the arm in pivoting upwards upon cutting, providing an arcuate path of the front of the cutting head, the offset between the head axis and the arm pivot axis provides that the rearward portion (i.e. the portion of the cutting head facing away from the cutting front) is distanced from the rock face. In this kind of operation, the offset is such that the head axis extends between the arm pivot axis and the cutting area or cutting face. The clearance angle between the cutting head and the rock face resulting from the offset prevents damage to the cutting head from the cut material or the rock face itself.

Preferably, the cutting apparatus further comprises a first and a second support pivotally mounted relative to the main frame via respective first and second support axes aligned generally along the first and second direction (e.g. upright relative to the upward and downward facing regions) such that each first and second support is configured to pivot in the third direction (e.g. laterally in a sideways direction relative to the side facing regions), at least one first and second support actuator to respectively actuate independently movement of each of the first and second supports relative to the main frame, wherein the first and second arm are mounted to enable the first and second arm to pivot relative to each of the respective first and second supports, and wherein the at least one first and second arm actuator is arranged to actuate independently pivoting movement of the first and second arms relative to each of the respective first and second support. The arrangement of laterally pivotable supports mounted (directly or indirectly) to the main frame while on each of the supports an arm is mounted which may be pivoted upwards and downwards was found provides a significant degree in freedom in terms of the profile to be cut while still allowing for a simple construction and an easy control.

It is also possible to provide—in alternative or in addition to the laterally pivotable supports—lateral pivoting members coupling each arm with the respective cutting head. Specifically, each arm may be provided with a lateral pivoting member configured to pivot around an axis directed along the upwards or downwards direction of the pivoting of the arm, wherein furthermore at least one pivoting member actuator is provided for enabling the pivoting of the lateral pivoting member.

Preferably, the cutting apparatus further comprises a powered sled movably mounted at the main frame to be configured to slide in a forward cutting direction of the apparatus relative to the main frame, wherein the first and second arm are pivotally mounted to the sled and the rotatable cutting head is configured to be moved in the first and second direction (e.g. upward and downward direction) and advanced in the forward cutting direction. The sled allows for additional movement of the cutting arrangement including the arms and the cutting heads in a lengthwise direction without a need for a movement of the complete cutting apparatus.

As a modification of the above, preferably each first and second arm together with the respective pivot arm axes is respectively mounted to the sled via a first and second support that is slidably mounted relative to the sled via a common or respective slidable means such that each first and second support is configured to slide laterally in the third direction (e.g. a sideways direction relative to the side facing regions).

Preferably, each cutting head comprises a generally annular cutting edge or layered cutting edges to provide an undercutting mode of operation. The configuration of each head to provide the undercutting action is advantageous to break the rock with less force and in turn provide a more efficient cutting operation that draws less power Preferably, the cutting apparatus further comprises a plurality of roller cutters independently rotatably mounted at each rotatable cutting head. More preferably, the plurality of roller cutters are generally annular roller cutters each having a generally annular cutting edge or layered cutting edges to provide an undercutting mode of operation. Such a configuration is advantageous to provide the undercutting action of the apparatus with the roller cutters first creating a channel or groove extending generally horizontally in the rock face. The roller cutters may then be moved upwardly to break the rock by overcoming the tensile forces immediately above the channel or groove. A more efficient cutting operation is provided requiring less force and drawing less power. Preferably, the roller cutters are mounted at generally cylindrical bodies and comprise generally annular cutting edges distributed around the perimeter of the cutting head. Each generally circular cutting edge is accordingly positioned side-by-side around the circumference of the cutting head with each cutting edge representing an endmost part of each pivoting arm. Preferably an alignment of the rotational axes of the roller cutters relative to the rotational axis of the respective cutting head is the same so that the respective cutting edges are all orientated in the same position around the cutting head.

Preferably, the cutting apparatus is arranged for a sump-in-position in which the cutting head is tilted forward by a sump-in-angle with respect to a rock face for sump-in (e.g. a floor plane). Specifically, the cutting apparatus may be provided with a (semi-)automated control having such preset position programmed, which can be selected by a user of the apparatus.

Preferably, the rotatable cutting head includes a plurality of roller cutters, wherein cutter axes of the roller cutters are inclined inwards so that an angle of attack of a cutting roller cutter is smaller than an angle between a plane defined by the cutting head and the rock to be cut. The smaller the angle of attack is, the more effective the undercutting may be performed. The tilted arrangement of the roller cutters reduces the impact of a clearance angle provided between the cutting head and the ground/floor/rock face.

Preferably, each of the rotatable cutting heads mounted to the first and second arms is rotatable about a respective head axis orientated to extend substantially transverse to each respective arm pivot axis, wherein the head axis is inclined with respect to a plane perpendicular to the arm pivot axis of the arm. The inclination is preferably such that the axes are tiled inwards on the side of the cutting head opposite to the rock to be cut. The inclination gives a clearance angle on one side of the cutting head, allowing also for a lateral cutting, for example for planarizing the floor area between the cutting head or supports.

Preferably, the inclination of the roller cutters discussed above with respect to the cutting head is equal to or smaller than the inclination of the head axis, maintaining also a clearance angle in case of a lateral movement of the cutting head.

Preferably, each rotatable cutting head includes a plurality of roller cutters arranged such that cutting edges of the roller cutters follow a common cutting path, allowing for a close cooperation of the different roller cutters in cutting the rock. It is understood that the following of the cutting paths occurs in the case of a rotating, i.e. operating, cutting head.

Preferably, between adjacent roller cutters of each rotatable cutting head, respectively, at least one of, a free space, a scraper element and a separation element is provided, wherein the scraper element is arranged to remove cut material from a cutting path and wherein the separation element provides a closed circumference of the cutter head. The scraper element, which is preferably exchangeable, between two roller cutters serves to clean the cutting path for the following roller cutter, increasing the efficiency of the cutting process. In particular in case of blocky ground conditions, the scraper element may be replaced by, for example, bolt-on segments between the roller cutters, providing a closed circular circumference of the cutter head and prohibiting rocks being jammed between the roller cutters. Nevertheless, depending on the circumstances, the space between the roller cutters may also be left free or open.

Preferably, the roller cutters are evenly distributed along the outer circumference of the cutting and are exchangeable.

Preferably, in regard to the method according to the invention, the positioning step includes a forward movement of the first and second arm relative to the main frame. This forward movement allows for a sump-in of the cutting head, which is not yet pivoted.

Further, preferably, the cutting apparatus comprises a first and second support pivotally mounted relative to the main frame via respective first and second support axes, for example, aligned generally upright relative to the upward and downward facing regions such that each first and second support is configured to pivot laterally in a sideways direction relative to the side facing regions, wherein at least one of a profiling step including a pivoting the first arm and pivoting the second arm while rotating the cutting head and engaging the rotating cutting head into a rock face together with a lateral pivoting of at least one of the first and second support, to which the first and second arm are mounted, and a trimming step including lateral pivoting of at least one of the first and second support.

According to an embodiment of the present invention, each cutting head further comprising a plurality of spray nozzles arranged for spraying a liquid towards a cutting path of the cutting head. The liquid, e.g. water or water provided with additives, may have multiple positive effects on the cutting process. For example, the liquid may have a cooling effect on the cutting head (or roller cutters), thereby extending the service live of the elements. Additionally, the liquid may serve to remove fines remaining in the area of the cutting path after cutting, thereby reducing wear on the cutting equipment. Furthermore, the liquid reduces the release of dust upon cutting. If the conditions on location allow (i.e. if not for some reason, e.g. geological considerations, water and/or mud were not allowed), the spraying of liquid gives a significant benefit in terms of working conditions and maintenance.

Even though the provision of the spray nozzles is particularly advantageous in the context of the invention as discussed above, it is to be noted that it is also contemplated to provide such arrangement (and the modifications thereof discussed herein) with cutting heads of other or different cutting apparatus.

Preferably, a feeding arrangement is provided arranged to control provision of liquid to the spray nozzles such that a specified set of spray nozzles are provided with liquid and spray nozzles not included in the specified set are not provided with liquid, wherein the specified set of spray nozzles is specified by a rotational position of the cutting head around the head axis, in other words by a rotational position of the spray nozzles relative to the cutting area. A selective control of providing liquid, for example, only to those spray nozzles close to the cutting area limits the amount of liquid needed, as in areas other than the cutting area, any sprayed liquid may have only limited positive effect, if at all.

Accordingly, in the context of operating a cutting head, preferably, the cutting procedures include such selective spraying or provision of liquid.

In regard to the cutting apparatus as they are discussed above, in case is not already mentioned explicitly, it is preferred that the rotatable cutting head(s) is/are rotatable about a head axis orientated to extend substantially transverse to the arm pivot axis. Other arrangements or configurations of the rotatable cutting head are also contemplated, including but not limited to a configuration as disclosed, for example, in U.S. Pat. No. 8,690,262 B2.

The further objectives are achieved by providing a cutting apparatus having a plurality of rotatably mounted cutting heads that may be pivoted in an upward and downward direction and a lateral side-to-side direction via a plurality of independently pivoting booms mounted at a main frame. In particular, each boom comprises a support pivotally mounted to the main frame and carrying an arm via a respective additional pivot mounting such that each cutting head is capable of pivoting about two pivoting axes. The desired range of movement of each head is provided as the dual pivoting axes are aligned transverse (including perpendicular) to one another and are spaced apart in the longitudinal direction of the apparatus between a forward and rearward end.

Advantageously, the cutting heads comprise a plurality of disc-like roller cutters distributed circumferentially around a perimeter of each head so as to create a groove or channel into the rock face as the heads are driven about their respective rotational axes.

The heads may then be raised vertically so as to overcome the relatively low tensile strength of the overhanging rock to provide breakage via force and energy that is appreciably lower than a more common compressive cutting action provided by cutting picks and the like.

According to a further aspect of the present invention there is provided cutting apparatus suitable for creating tunnels or subterranean roadways and the like comprising: a main frame having generally upward, downward and side facing regions; a first and second support pivotally mounted relative to the main frame via respective first and second support axes aligned generally upright relative to the upward and downward facing regions such that each first and second support is configured to pivot laterally in a sideways direction relative to the side facing regions; at least one first and second support actuator to respectively actuate independently movement of each of the first and second supports relative to the main frame; a first and second arm each pivotally mounted to the respective first and second support via a respective arm pivot axis aligned in a direction extending transverse including perpendicular to each support pivot axis to enable the first and second arms to pivot independently of one another and to pivot relative to each of the respective first and second supports in an upward and downward direction relative to the upward and downward facing regions; at least one first and second arm actuator to actuate independently pivoting movement of the first and second arms relatives to each of the respective first and second support; a rotatable cutting head mounted at each of the first and second arms, each head rotatable about a head axis orientated to extend substantially transverse to each respective arm pivot axis.

Reference within this specification to each head being rotatable about a head axis orientated to extend substantially transverse to each respective arm pivot axis includes (or encompasses) a perpendicular alignment. Such a reference also encompasses the respective pivot axes intersecting or more preferably not intersecting with the rotational axes of the cutting heads. Optionally, the rotational axes of the cutting heads are positioned generally in front of and/or above the respective pivot axes of the pivot arms.

Optionally, each cutting head comprises a generally annular cutting edge or layered cutting edges to provide an undercutting mode of operation. The configuration of each head to provide the undercutting action is advantageous to break the rock with less force and in turn provide a more efficient cutting operation that draws less power.

Preferably, the apparatus comprises a plurality of roller cutters independently rotatably mounted at each rotatable cutting head. Preferably, the roller cutters are generally annular roller cutters each having a generally annular cutting edge or layered cutting edges to provide an undercutting mode of operation. More preferably, the roller cutters are mounted at a perimeter region of each cutting head such that the roller cutters circumferentially surround each cutting head. Such a configuration is advantageous to provide the undercutting action of the apparatus with the roller cutters first creating a channel or groove extending generally horizontally in the rock face. The roller cutters may then be moved upwardly to break the rock by overcoming the tensile forces immediately above the channel or groove. A more efficient cutting operation is provided requiring less force and drawing less power. Preferably, the roller cutters are mounted at generally cylindrical bodies and comprise generally annular cutting edges distributed around the perimeter of the cutting head. Each generally circular cutting edge is accordingly positioned side-by-side around the circumference of the cutting head with each cutting edge representing an endmost part of each pivoting arm. Preferably an alignment of the rotational axes of the roller cutters relative to the rotational axis of the respective cutting head is the same so that the respective cutting edges are all orientated in the same position around the cutting head.

Preferably, each of the first and second arm actuator comprises a planetary gear assembly mounted at the junction at which each arm pivots relative to each support. The subject invention may comprise a conventional planetary gear arrangement such as a Wolfram type planetary gear having a high gear ratio. The planetary gear assembly is mounted internally with each arm such that the cutting apparatus is designed to be as compact as possible. Preferably, the apparatus further comprises at least one first drive motor to drive the pivoting movement of the first and/or second arm relative to the respective first and second support and the main frame. Preferably, the apparatus comprises two drive motors to drive each of the first and second arms about their pivoting axis via the respective planetary gears. Preferably, the respective drive motors are mounted in-board of each arm and are coupled to each arm via the planetary gear assembly and/or an intermediate drive transmission.

Preferably, the apparatus further comprises at least one second drive motor to drive rotation of the cutting head at the first and/or the second arm. Preferably, each head comprises two drive motors mounted at the side of each arm. Such an arrangement is advantageous to pivot each drive motor with each cutting head and to provide a direct drive with minimal intermediate gearing.

Optionally, the first and second support actuator comprises a hydraulic linear actuator. Preferably, each support actuator comprises a linear hydraulic cylinder positioned at the lateral sides of the sled and coupled to extend between the sled and an actuating flange extending laterally outward from each support. Such an arrangement is advantageous to minimise the overall width of the apparatus whilst providing an efficient mechanism for the sideways lateral slewing of each support and accordingly each arm.

Optionally, the sled may be positioned to operate longitudinally between the supports and each of the respective arms. That is, each arm may be configured to slide in the axially forward direction relative to each support via one or a plurality of actuators. Optionally, each arm is connected to each support via a respective sliding actuator such that each arm is configured to slide independently relative to one another. Optionally, each arm may be configured to slide in a forward and rearward direction relative to each support via a coordinated parallel sliding mechanism.

Preferably, the apparatus further comprises a powered sled movably mounted at the main frame to be configured to slide in a forward cutting direction of the apparatus relative to the main frame. The apparatus may further comprise a plurality of 'runners' or guide rails to minimise the frictional sliding movement of the sled over the main frame. Preferably, the apparatus comprises at least one powered linear actuator to provide the forward and rearward movement of the sled relative to the main frame. As will be appreciated, the sled may be configured to move axially/longitudinally at the machine via a plurality of different actuating mechanisms including rack and pinion arrangements, belt drive arrangements, gear arrangements and the like. Preferably the supports and the arms are mounted at the sled and are all configured to move in the forward and rearward direction collectively.

Optionally, each of the first and second arms is configured to pivot in the upward and downward direction by up to 180°. Optionally, each arm may be configured to pivot over a range of up to 155°. Optionally, the first and second supports are configured to pivot in the lateral sideways direction by up to 90°. Optionally, the supports may be configured to pivot up to 20° in the lateral sideways direction. Such a configuration provides control of the profile shape and avoids any cuts or ridge that would otherwise remain on the roof and floor of the as-formed tunnel.

Preferably, the apparatus comprises tracks or wheels mounted at the main frame to allow the apparatus to move in a forward and rearward direction. The tracks or wheels enable the apparatus to be advanced forwardly and rearwardly within the tunnel both when manoeuvred into and from the cutting face between cutting operations and to be advanced forwardly during cutting operations as part of the cut-and-advance cutting cycle that also utilises the sliding sled.

Preferably, the apparatus further comprises floor and roof engaging members mounted at the main frame, at least the floor engaging members being extendable and retractable to respectively raise and lower the apparatus in the upward and downward direction. The engaging members are configured to wedge the apparatus in position between the roof and floor of the tunnel to provide points of anchorage against which the machine may be braced to allow the cutters to be forced against the rock face.

Preferably, the apparatus further comprises a first material discharge conveyor to convey cut material rearwardly from the first and second cutting head; and a gathering head to direct cut material onto the conveyor, the gathering head positioned rearwardly behind at least one of the first and second cutting heads. The apparatus is accordingly configured to transport rearwardly material from the cut face to provide unhindered forward cutting movement into the rock.

Preferably, the apparatus further comprises a control unit demountably connectable to the apparatus, the control unit comprising operational components to power at least the first and second support and arm actuators, the control unit further comprising a second conveyor to receive material from the first conveyor and to discharge the material at a position rearward of the apparatus and the control unit. Preferably, the control unit is demountably coupled to the apparatus so as to be capable of being advanced and retracted in the forward and rearward directions with the cutting apparatus. Preferably, the control unit is suspended above the tunnel floor by suitable couplings to the apparatus. The control unit may comprise ground engaging support members provided at a rearward and/or forward regions. Optionally, the control unit may be attachable at its rearward end to a material collection and discharge vehicle and to be connectable at its forward end to the cutting apparatus.

According to a further aspect of the present invention there is provided cutting apparatus suitable for creating tunnels or subterranean roadways and the like comprising: a main frame having generally upward, downward and side facing regions; a powered sled movably mounted at the main frame to be configured to slide in a forward cutting direction of the apparatus relative to the main frame; a first and second arm pivotally coupled or mounted to the sled by respective pivot arm axes aligned in a direction extending transverse including perpendicular to a longitudinal axis of the main frame to allow each arm to pivot independently of one another in an upward and downward direction relative to the upward and downward facing region of the main frame; at least one first and second arm actuator to actuate independent pivoting movement of the first and second arms relative to one another and the main frame; a rotatable cutting head mounted at each of the first and second arms so as to be configured to be moved in the upward and downward direction and advanced in the forward cutting direction, each head rotatable about a head axis orientated to extend substantially transverse to respective pivot arm axes.

Optionally, the first and second arm together with the respective pivot arm axes are respectively coupled or mounted to the sled via a first and second support, the first and second supports are slidably mounted relative to the sled via a common or respective slidable means such that each first and second support is configured to slide laterally in a sideways direction relative to the side facing regions. The first and second supports are mounted at the sled and configured to slide laterally cross the sled substantially perpendicular to the forward and backward sliding movement of the sled relative to the main frame.

Optionally, each rotatable cutting head comprises a generally annular roller cutter each having a generally annular cutting edge or layered cutting edges to provide an undercutting mode of operation.

Preferably, the apparatus further comprises a plurality of roller cutters independently rotatably mounted at each rotatable cutting head. Optionally, the plurality of roller cutters are generally annular roller cutters each having a generally annular cutting edge or layered cutting edges to provide an undercutting mode of operation.

According to a further aspect of the present invention there is provided cutting apparatus configured to create a cutting profile via an undercutting operation to create tunnels and subterranean roadways, the apparatus comprising: a main frame; a first and second arm pivotally mounted to the main frame by respective pivot arm axes aligned in a direction extending transverse including perpendicular to a longitudinal axis of the main frame to allow each arm to pivot independently of one another in an upward and downward direction relative to an upward and downward facing region of the main frame; at least one first and second arm actuator to actuate independent pivoting movement of the first and second arms relative to one another and the main frame; a rotatable cutting head mounted at each of the first and second arms, each cutting head comprising generally annular roller cutters each having a generally annular cutting edge to provide an undercutting mode of operation.

Preferably, the apparatus comprises a first and second support pivotally mounted relative to the main frame via respective first and second support axes aligned generally upright relative to the upward and downward facing regions such that each first and second support is configured to pivot laterally in a sideways direction relative to the side facing regions.

Preferably, the apparatus further comprises a powered sled movably mounted at the main frame, the first and second arms mounted at the sled so as to be capable of longitudinal reciprocating movement to slide in a forward cutting direction of the apparatus to engage the roller cutters into the rock face.

BRIEF DESCRIPTION OF DRAWINGS

A specific implementation of the present invention will now be described, by way of example only, and with reference to the accompanying drawings in which:

FIG. 13 is a view corresponding to the view shown in FIG. 10 from opposite direction;

FIG. 14 is a sectional side elevation view of the cutting head shown in FIGS. 10 and 13;

FIG. 15 is a simplified view showing a cutting head in relation to a face of rock to be cut;

FIG. 16 is a rear view of the situation of FIG. 15;

DETAILED DESCRIPTION OF PREFERRED EMBODIMENT OF THE INVENTION

Figure 1:
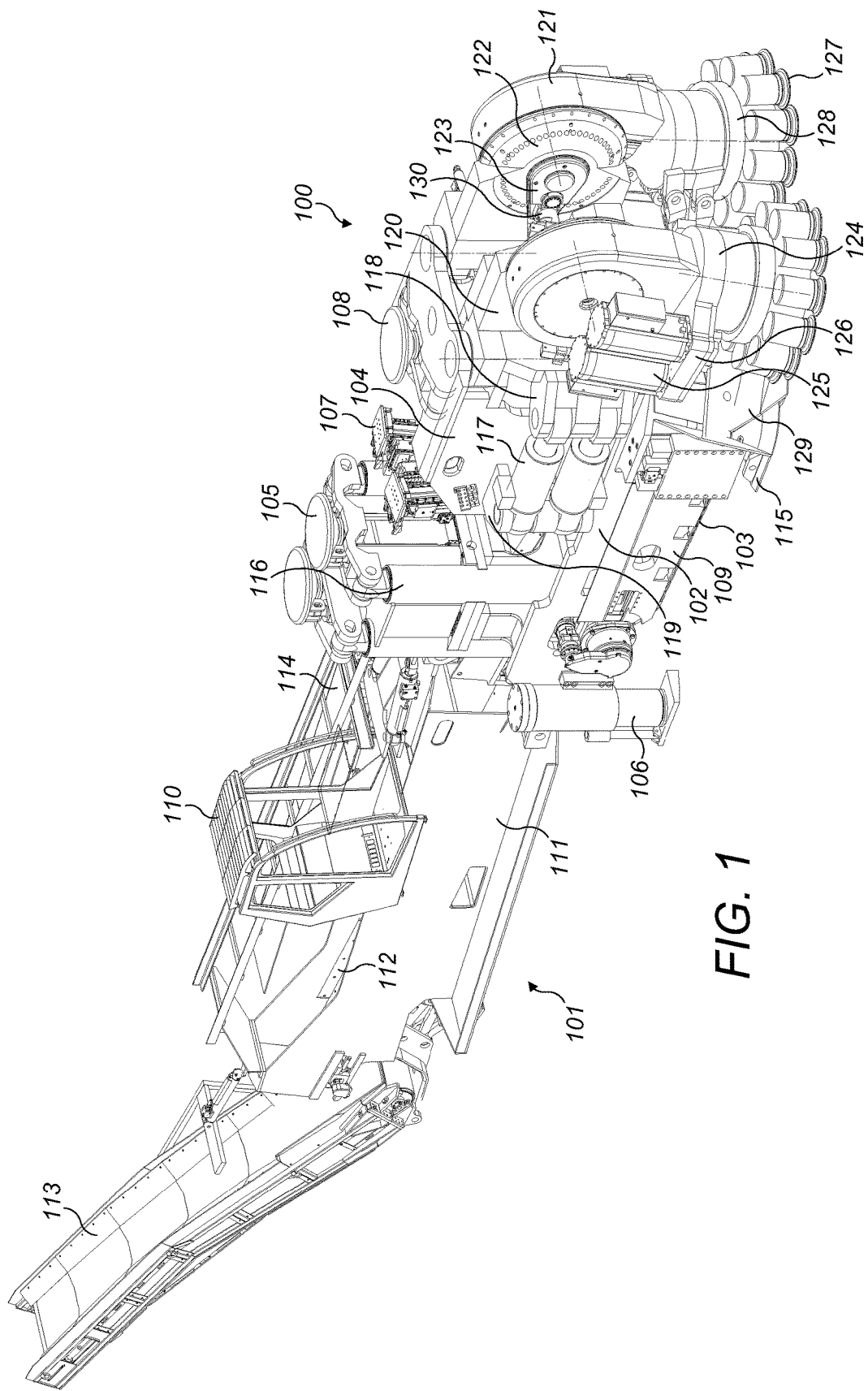
FIG. 1 is a front perspective view of a mobile cutting apparatus suitable for creating tunnels or subterranean roadways having a forward mounted cutting unit and a rearward control unit according to a specific implementation of the present invention.

Referring to FIG. 1, cutting apparatus 100 comprises a main frame 102 mounting a plurality of cutting components configured to cut into a rock or mineral face to create tunnels or subterranean roadways. Apparatus 100 is configured specifically for operation in an undercutting mode in which a plurality of rotatable roller cutters 127 may be forced into the rock to create a groove or channel and then to be pivoted vertically upward so as to overcome the reduced tensile force immediately above the groove or channel and break the rock. Accordingly, the present cutting apparatus is optimised for forward advancement into the rock or mineral utilising less force and energy typically required for conventional compression type cutters that utilise cutting bits or picks mounted at rotatable heads. However, the present apparatus may be configured with different types of cutting head to those described herein including in particular pick or bit type cutting heads in which each pick is angularly orientated at the cutting head to provide a predetermined cutting attack angle.

Figure 2:
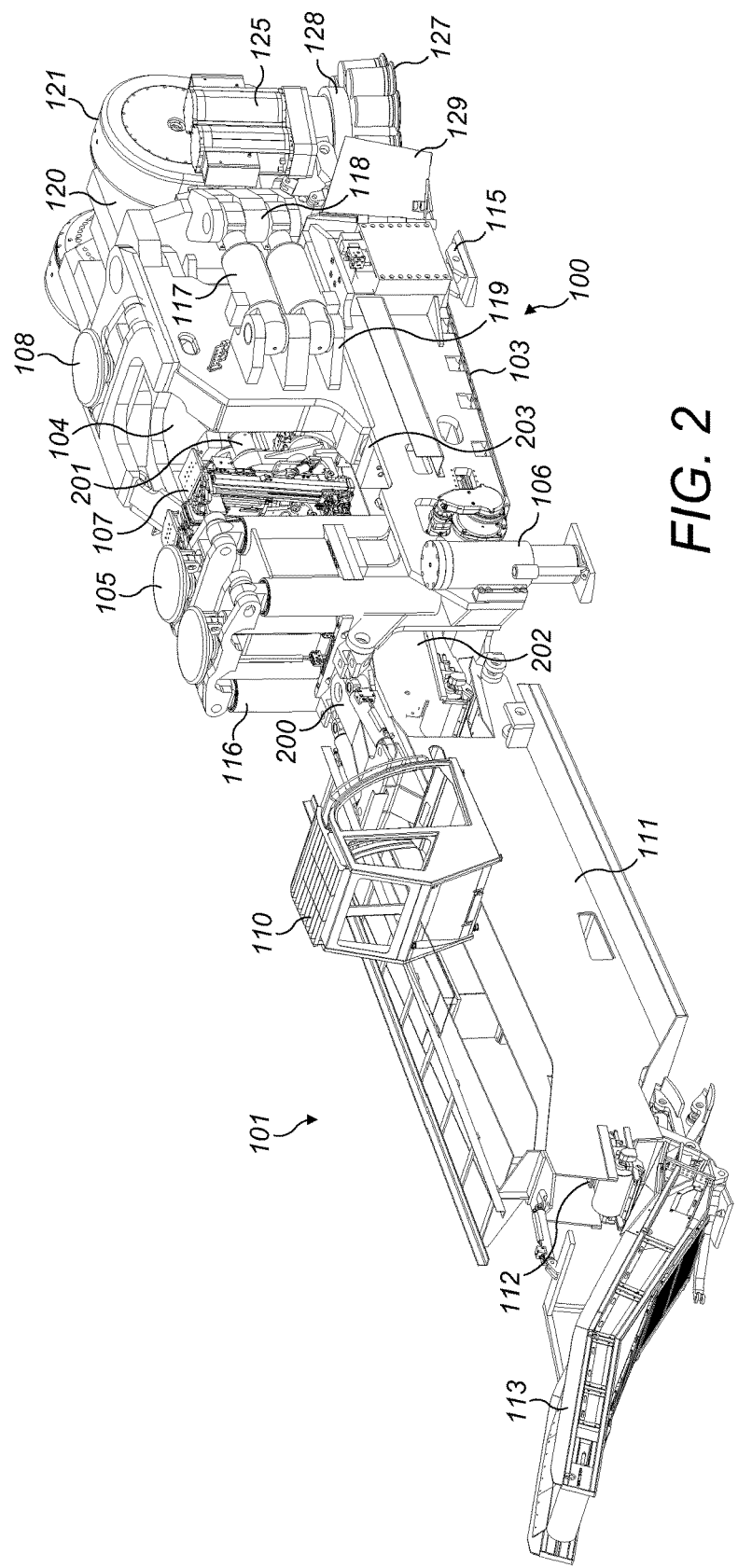
FIG. 2 is a rear perspective view of the cutting apparatus of FIG. 1.
Figure 3:
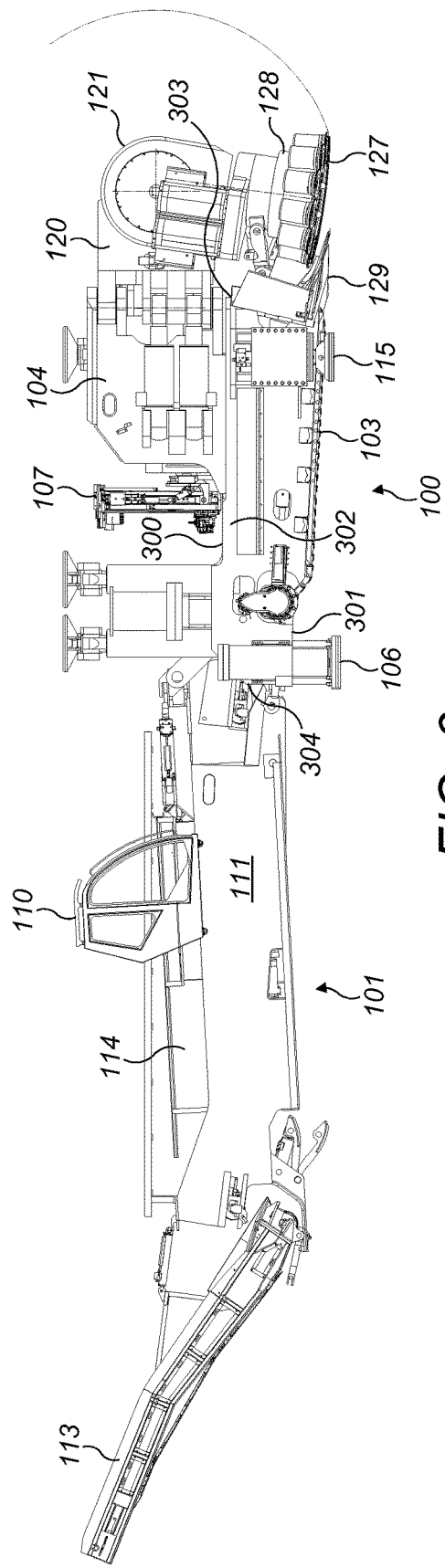
FIG. 3 is a side elevation view of the apparatus of FIG. 2.

Referring to FIGS. 1 to 3, main frame 102 comprises lateral sides 302 to be orientated towards the wall of the tunnel; an upward facing region 300 to be orientated towards a roof of the tunnel; a downward facing region 301 orientated to be facing the floor of the tunnel; a forward facing end 303 intended to be positioned facing the cutting face and a rearward facing end 304 intended to be positioned facing away from the cutting face.

An undercarriage 109 is mounted generally below main frame 102 and in turn mounts a pair of crawler tracks 103 driven by a hydraulic (or electric) motor to provide forward and rearward movement of apparatus 100 over the ground when in a non-cutting mode. A pair of rear ground engaging jacking legs 106 is mounted at frame sides 302 towards rearward end 304 and is configured to extend and retract linearly relative to frame 102. Frame 102 further comprises a forward pair of jacking legs 115 also mounted at each frame side 302 and towards forward end 303 and being configured to extend and retract to engage the floor tunnel. By actuation of legs 106, 115, main frame 102 and in particular tracks 103 may be raised and lowered in the upward and downward direction so as to suspend tracks 103 off the ground to position apparatus 100 in a cutting mode. A pair of roof engaging grippers 105 project upwardly from main frame 102 at frame rearward end 304 and are extendable and retractable linearly in the upward and downward direction via control cylinders 116. Grippers 105 are therefore configured to be raised into contact with the tunnel roof and in extendable combination with jacking legs 106, 115 are configured to wedge apparatus 100 in a stationary position between the tunnel floor and roof when in the cutting mode.

A sled 104 is slidably mounted on top of main frame 102 via a slide mechanism 203. Sled 104 is coupled to a linear hydraulic cylinder 201 such that by reciprocating extension and retraction of cylinder 201, sled 104 is configured slide linearly between frame forward and rearward ends 303, 304.

A pair of hydraulically actuated bolting units 107 is mounted at main frame 102 between sled 104 and roof gripping unit 105, 116 relative to a lengthwise direction of the apparatus. Bolting units 107 are configured to secure a mesh structure (not shown) to the roof of the tunnel as apparatus 100 is advanced in a forward cutting direction. Apparatus 100 also comprises a mesh support structure (not shown) mounted generally above sled 104 so as to positionally support the mesh directly below the roof prior to bolting into position.

Figure 5:
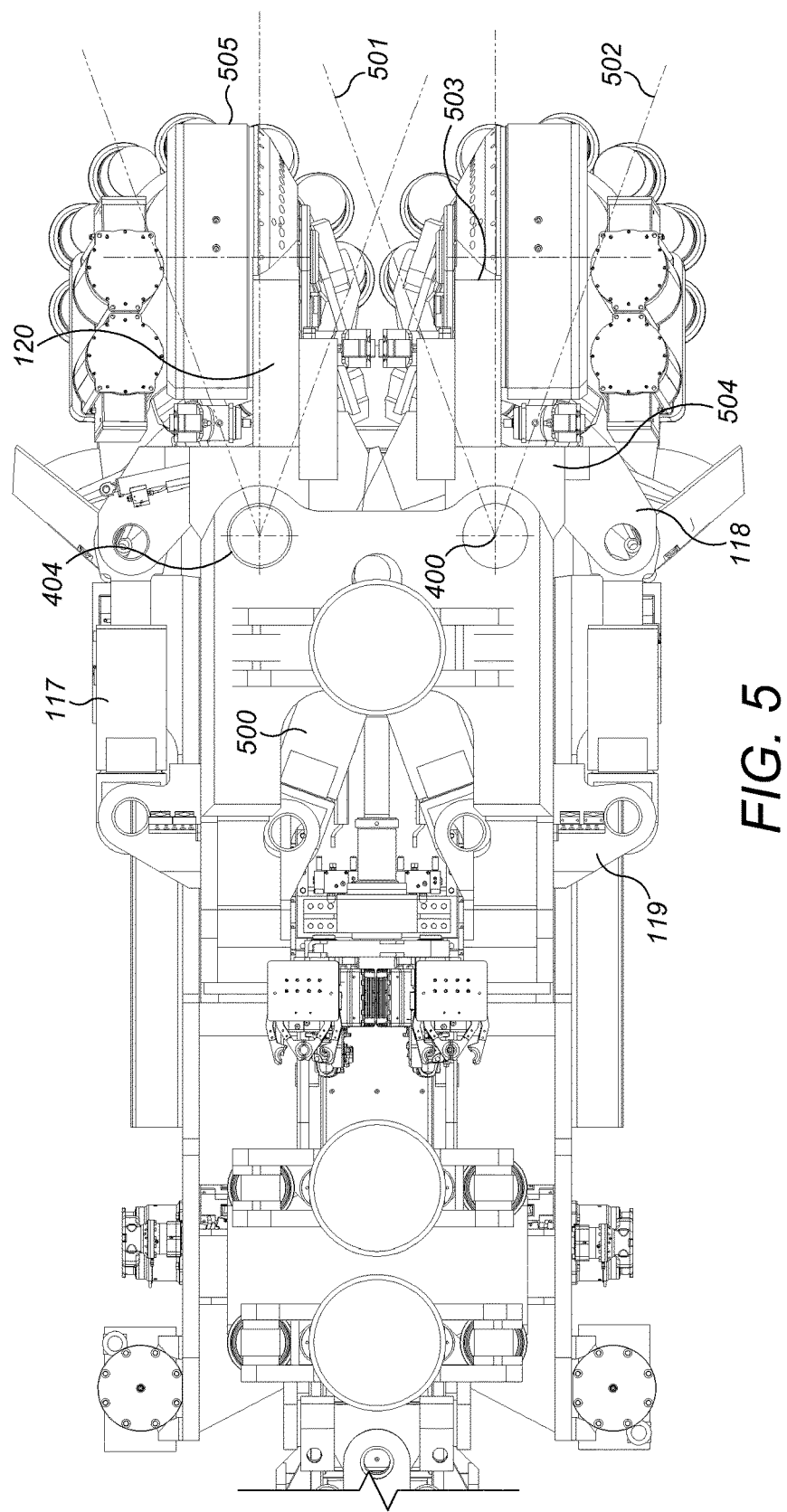
FIG. 5 is a plan view of the cutting apparatus of FIG. 4.

A pair of supports 120 are pivotally mounted at and project forwardly from sled 104 immediately above frame forward end 303. Supports 120 are generally spaced apart in a lateral widthwise direction of the apparatus 100 and are configured to independently pivot laterally outward from one another relative to sled 104 and main frame 102. Each support 120 comprises a forward end 503 and a rearward end 504 referring to FIG. 5. A first mount flange 118 is provided at support rearward end 504 being generally rearward facing. A corresponding second mount flange 119 projects laterally outward from a side of sled 104 immediately behind the first flange 118. A pair of linear hydraulic cylinders 117 is mounted to extend between flanges 118, 119 such that by linear extension and retraction, each support 120 is configured to pivot in the generally horizontal plane and in the lateral sideways direction relative to frame sides 302. Referring to figured 4, each support 120 is mounted at sled 104 via a pivot rod 404 extending generally vertically (when apparatus 100 is positioned on horizontal ground) through sled 104 and being suspended generally above the main frame forward end 303. Each support 120 is therefore configured to pivot or slew about pivot axis 400. Referring to FIG. 5, each support 120 is further coupled to a respective inner hydraulic cylinder 500 mounted at an inner region of sled 104 to cooperate with side mounted cylinders 117 to laterally slew each support 120 about pivot axis 400.

Figure 4:
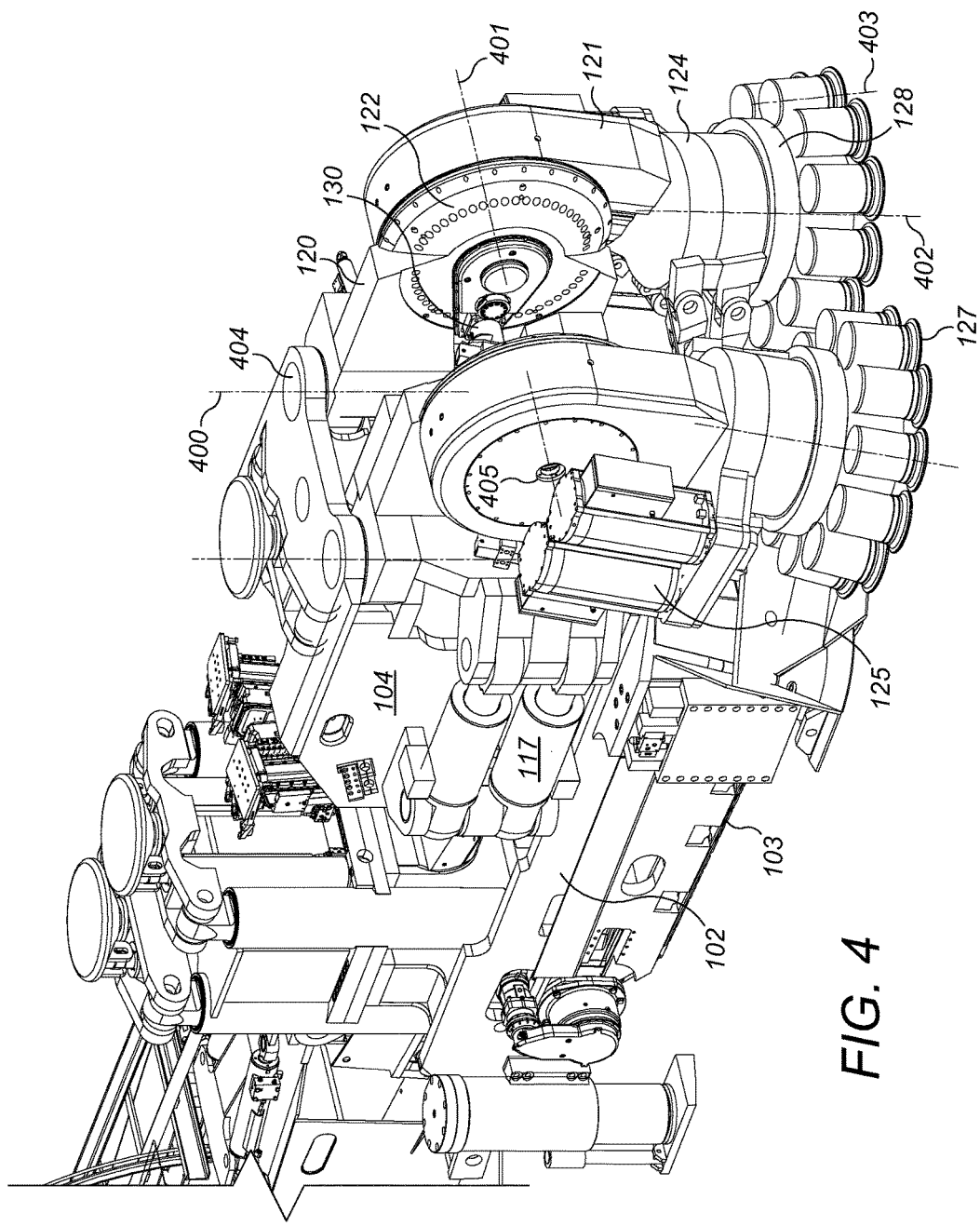
FIG. 4 is a magnified front perspective view of the cutting unit of the apparatus of FIG. 3.

Referring to FIGS. 4 and 5, as the respective pivot axes 400 are space apart in the widthwise direction of apparatus 100, supports 120 are capable of being slewed inwardly to a maximum inward position 501 and to be slewed laterally outward to a maximum outward position 502. According to the specific implementation, an angle between the inner and outer slewing positions 501, 502 is 20°.

Figure 7:
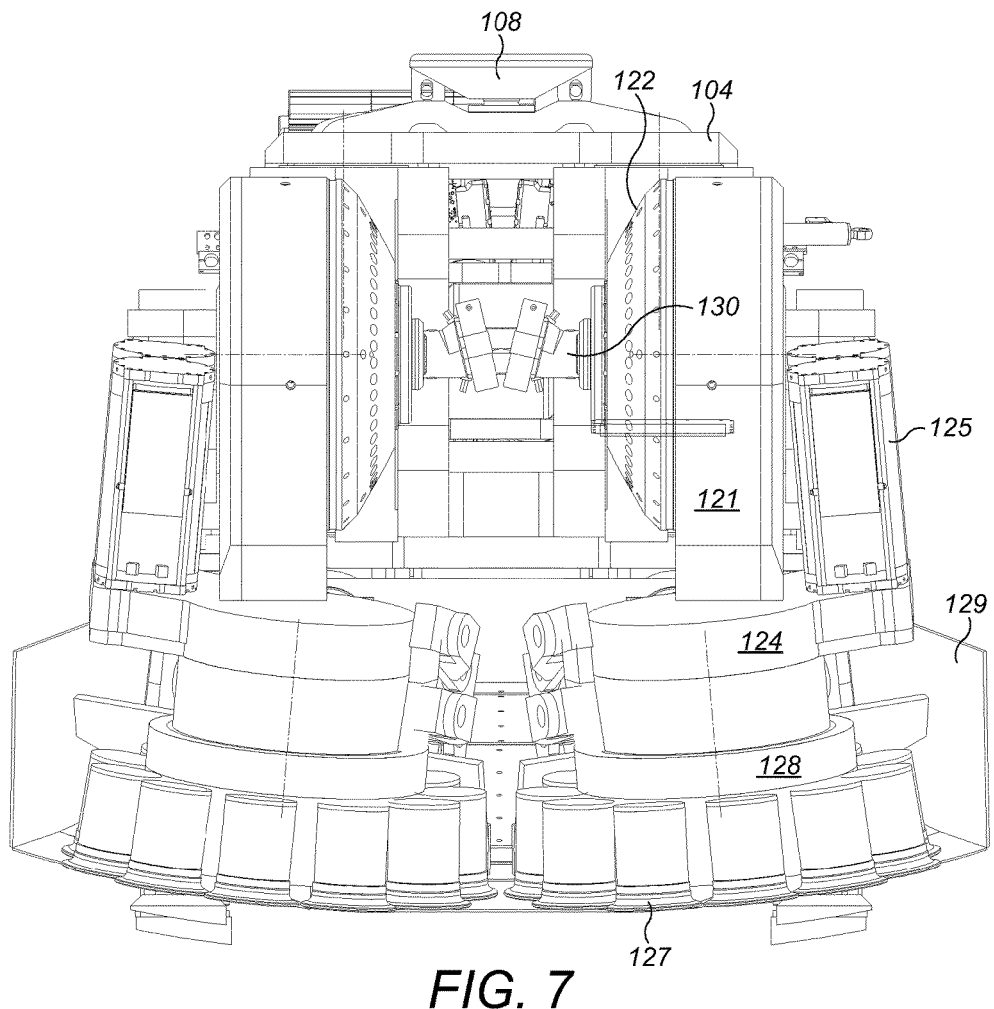
FIG. 7 is a front end view of the cutting apparatus of FIG. 6.

Referring to FIGS. 1 to 3, an arm 121 is pivotally mounted generally at the forward end 503 of each support 120. Each arm 121 comprises a cutting head 128 rotatably mounted at a distal end. Each cutting head 128 comprises a disk like (generally cylindrical) configuration. The plurality of generally annular or disc shaped roller cutters 127 are mounted at the circumferential perimeter of each head 128 and comprise a sharp annular cutting edge configured specifically for undercutting the rock. Cutters 127 are rotatably mounted independently relative to one another and head 128 and are generally free to rotate about their own axis. Each roller cutter 127 projects axially beyond a forwardmost annular edge of head 128 such that when arms 121 are orientated to be extending generally downward, roller cutters 127 represent a lowermost part of the entire head 128 and arm 121 assembly. Each arm 121 may be considered to comprise a length such that arm 121 is mounted at each respective support 120 at or towards a proximal arm end and to mount each head 128 at a distal arm end. In particular, each arm 121 comprises an internally mounted planetary gear indicated generally be reference 122. Each gear 122 is preferably a Wolfrom type and is coupled to a drive motor 130 via a drive train indicated generally by reference 123. A pair of drive motors 125 are mounted at the lateral sides of each arm 121 and are orientated to be approximately parallel with the rotational axis of each respective cutting head 128 as shown in FIG. 7. Each arm 121 further comprise an internal drive and gear assembly 124 coupled to a gear box 126 mounted at one end of each of the drive motors 125. Each cutting head 128 is driveably coupled to the drive motors 125 via the respective gear assembly 124 to provide rotation of cutting head 128 about axis 402.

Figure 6:
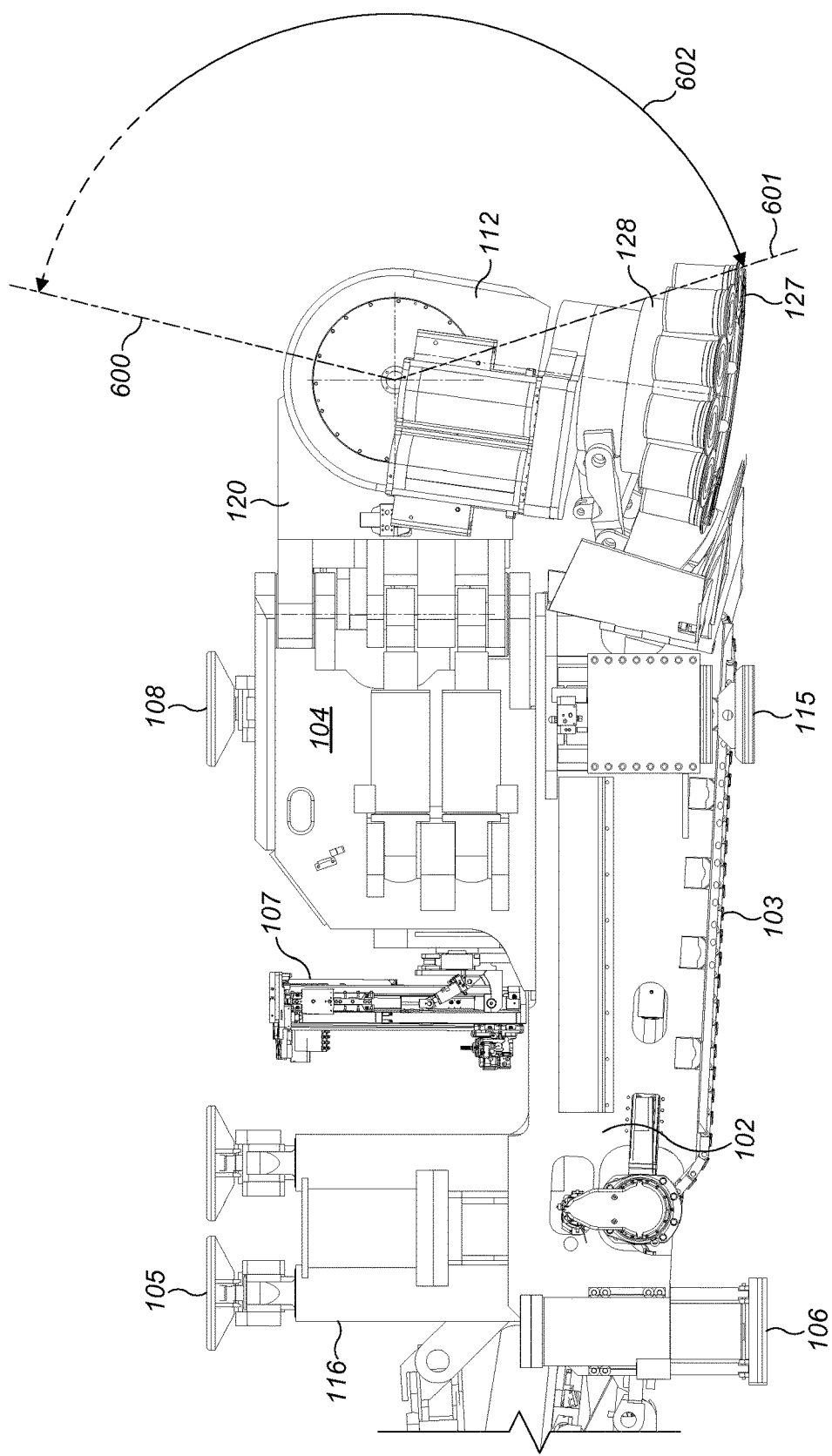
FIG. 6 is a side elevation view of the cutting apparatus of FIG. 5.

According to the specific implementation, and as shown in FIG. 7, each arm 121 is coupled to a respective motor 130 mounted at a forward end of sled 104. Each planetary gear 122 is centred on a pivot rod 405 having a pivot axis 401 referring to FIG. 4. Each axis 401 is aligned to be generally horizontal when apparatus 100 is positioned on horizontal ground. Accordingly, each arm 121 is configured to pivot (relative to each support 120, sled 104 and main frame 102) in the upward and downward direction (vertical plane) by actuation of each motor 130. As such, each cutting head 128 and in particular the roller cutters 127 may be raised and lowered along the arcuate path 602 referring to FIG. 6. In particular, each arm 121, head 128 and roller cutters 127 may be pivoted between a lowermost position 601 and an uppermost raised position 600 with an angle between positions 600, 601 being approximately 150°. When in the lowermost position 601, each roller cutter 127 and in particular head 128 is suspended in a declined orientation such that a forwardmost roller cutter 127 is positioned lower than a rearwardmost roller cutter 127. According to the specific implementation, this angle of declination is 10°. This is advantageous to engage the cutters 127 into the rock face at the desired attack angle to create the initial groove or channel during a first stage of the undercutting operation. Additionally, the extensive range of movement of the cutting heads 128 over the rock face is possible due, in part, to axis 401 being separated and positioned forward relative to axis 400 by a distance corresponding to a length of each support 120.

Referring to FIG. 4, each support pivot axis 400 is aligned generally perpendicular to each arm pivot axis 401. Additionally, a rotational axis 402 of each cutting head 128 is orientated generally perpendicular to each arm pivot axis 401. A corresponding rotational axis 403 of each roller cutter 127 is angularly disposed relative to cutting head axis 402 so as to taper outwardly in the downward direction. In particular, each roller cutter axis 403 is orientated to be aligned closer to the orientation of each cutting head rotational axis 402 and support pivot axis 400 relative to the generally perpendicular arm rotational axis 401.

Accordingly, each support 120 is configured to slew laterally outward in a horizontal plane about each support axis 400 between the extreme inner and positions 501, 502. Additionally and referring to FIG. 6, each respective arm 121 is configured to pivot in the upward and downward direction about arm axis 401 to raise and lower the roller cutters 127 between the extreme positions 600, 601.

A gathering head 129 is mounted at main frame forward end 303 immediately rearward behind each cutting head 128. Gathering head 129 comprises a conventional shape and configuration having side loading aprons and a generally inclined upward facing material contact face to receive and guide cut material rearwardly from the cutting face (and cutting heads 128). Apparatus 100 further comprises a first conveyor 202 extending lengthwise from gathering head 129 to project rearwardly from frame rearward end 304. Accordingly, material cut from the face is gathered by head 129 and transported rearwardly along apparatus 100.

Referring to FIGS. 1 to 3, a detachable control unit 101 is mounted to the frame rearward end 403 via a pivot coupling 200. Control unit 111 comprises a personnel cabin 110 (to be occupied by an operator). Unit 111 further comprises an electric and hydraulic power pack 114 to control the various hydraulic and electrical components of apparatus 100 associated with the pivoting movement of supports 120 and arms 121 in addition to the sliding movement of sled 104 and the rotational drive of cutting heads 128.

Control unit 101 further comprises a second conveyor 112 extending generally lengthwise along the unit 101 and coupled at its forwardmost end to the rearwardmost end of first conveyor 202. Unit 101 further comprises a discharge conveyor 113 projecting rearwardly from the rearward end of second conveyor 112 at an upward declined angle. Accordingly, cut material is capable of being transported rearwardly from cutting heads 128 along conveyors 202, 112 and 113 to be received by a truck or other transportation vehicle.

In use, apparatus 100 is wedged between the tunnel floor and roof via jacking legs 106, 115 and roof grippers 105. Sled 104 may then be displaced in a forward direction relative to main frame 102 to engage roller cutters 127 onto the rock face. Cutting heads 128 are rotated via motors 125 that create the initial groove or channel in the rock face at a lowermost position. A first arm 121 is then pivoted about axis 401 via motor 130 to raise roller cutters 127 along path 602 to achieve the second stage undercutting operation. The first support 120 may then be slewed in the lateral sideways direction via pivoting about axis 400 and combined with the raising and lowering rotation of roller cutters 127 creates a depression or pocket within the rock immediately forward of the first arm 121 and support 120. The second arm 121 and associated head 128 and cutters 127 are then actuated according to the operation of the first arm 121 involving pivoting in both the vertical and horizontal planes. This sequential dual pivoting movement of the second arm 121 is independent of the initial dual pivoting movement of the first arm 121. A phasing and sequencing of the pivoting of arms 121 about axes 401 and supports 120 about axes 400 is controlled via control unit 111.

When the maximum forward travel of sled 104 is achieved, jacking legs 106, 115 are retracted to engage tracks 103 onto the ground. Tracks 103 are orientated to be generally declined (at an angle of approximately 10° relative to the floor) such that when ground contact is made, the roller cutters 127 are raised vertically so as to clear the tunnel floor. The apparatus 100 may then be advanced forward via tracks 103. Jacking legs 106, 115 may then be actuated again to raise tracks 103 off the grounds and grippers 105 moved into contact with the tunnel roof to repeat the cutting cycle. A forwardmost roof gripper 108 is mounted above sled 104 to stabilise the apparatus 100 when sled 104 is advanced in the forward direction via linear actuating cylinder 201.

Figures 8, 9:
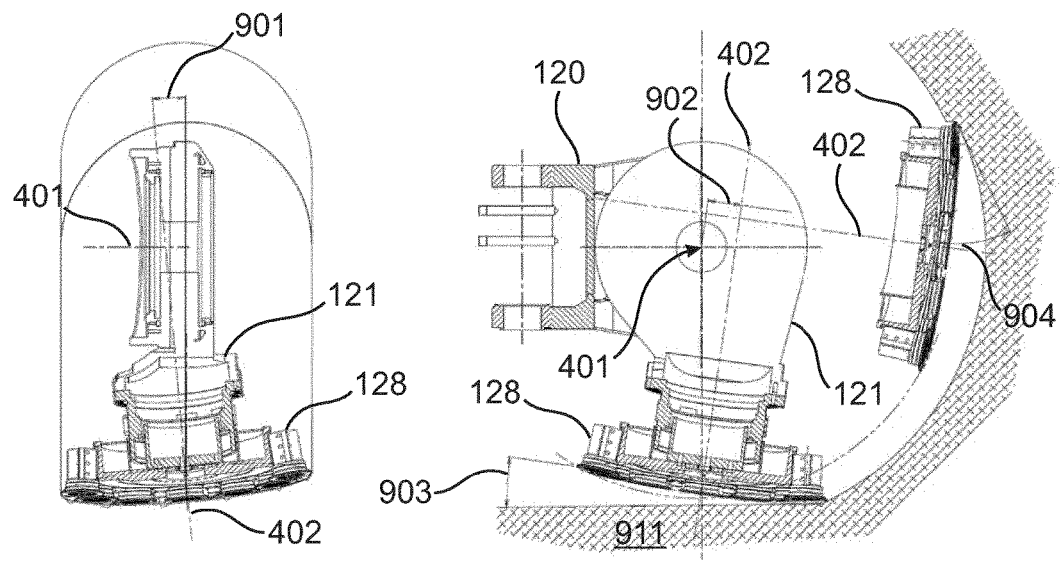
FIG. 8 is a simplified rear view of an arm and a cutting head of the cutting apparatus according to the invention.
FIG. 9 is a simplified side elevation view of the arm and cutting head of FIG. 8.

Referring to FIG. 8, the head axis 402 of the cutting head 128 is inclined with respect to the plane (vertical and perpendicular to the drawing plane) parallel to the arm 121, such that the cutting head 128 is tilted to the left (i.e. the left portion thereof in the drawing is lower than the right portion) by an angle 901. Accordingly, by slewing the support (not shown here) to which the arm 121 is mounted inwards (i.e. to the left in the drawing), the cutting head 128 cuts into the floor area, for example removing a ridge otherwise provided between the cutting paths of the cutting heads.

Referring to FIG. 9, which shows the cutting head 128 in a position with basically downwards pointing arm 121 and in a further position (without the arm being illustrated) corresponding to an upwards pivoting of the arm 121, the cutting head 128 mounted to the arm 121 is provided in an angle 903 with respect to the rock 911, specifically to the ground. The angle 903 provides clearance for the cutting operation. The head axis 402 is offset by an amount 902 to the forward direction (right direction in the drawing) from the pivot axis 401 of the arm 121, so to ensure that upon pivoting the arm 121, the cutting head 128 does not crush into the area behind the cutting area (see clearance angle 904).

The attitude of the downwards pointing arm 121 and the cutting head 128 shown is FIG. 9 substantially corresponds to a sump-in process. During sump-in, preferably, the combination of arm 121 and cutting head 128 is moved forward by means of the support 120 (e.g. being attached to a powered sled 104), i.e. the relation of the cutting head 128 with respect to the ground plane (e.g. an horizontal plane as shown in FIG. 9) is maintained. The forward edge of the cutting head 128 is positioned lower (i.e. closer to the ground) than the rearward edge thereof (as shown, for example, in FIGS. 3 and 6 and specifically in FIG. 9), such that the angle 903 is formed between the ground and a plane of the cutting head 128 (said plane being perpendicular to the head axis 402). In a case of horizontal ground, the angle 903 between the ground and the cutting head 128 is identical to an angle between a vertical line and the head axis 402. The inclination of the cutting head 128 provides that the circumferential edge thereof (where the cutting edges of the roller cutters 127 are provided) is at its closest to the ground at the forward portion. As shown more clearly in FIG. 17 and further discussed below, the roller cutters 127 are inclined inwards to reduce an angle of attack on the rock face.

In front of the forward edge of the cutting head 128 as shown in FIG. 9 (i.e. the rightmost portion thereof) the ground raises and upon a forward movement (i.e. a movement to the right in FIG. 9) of the arm 121 and the cutting head 128 together, the cutting head 128 (and move specifically the roller cutters 127 thereof) with cut into the raising ground, providing a cutting depth or edge (as shown above the raised cutting head 128), which is then cut by pivoting the arm 121, thereby raising the cutting head 128.

The value of the angle 903 is adjustable by controlling the direction of the arm 121, wherein this will also impact on the angle of attack of the cutting head 128 with respect to the rock to be cut. Additionally, a change in direction of the arm 121 influences the vertical distance between the pivot axis 401 and the forward edge of the cutting head 128 (i.e. the difference in respective heights above the ground). Accordingly, by adjusting the height of the pivot axis 401 (e.g. by adjusting the raising and/or tilting of the cutting apparatus 100 by the ground engaging jacking legs 106, 115) and by providing a properly pivoted arm 121, the value of angle 903 may be adjusted, such that a desired angle of attack for the roller cutters 127 and sufficient clearing for the further parts of the cutting head 128 in relation to the ground may be achieved.

Figures 10, 11, 12:
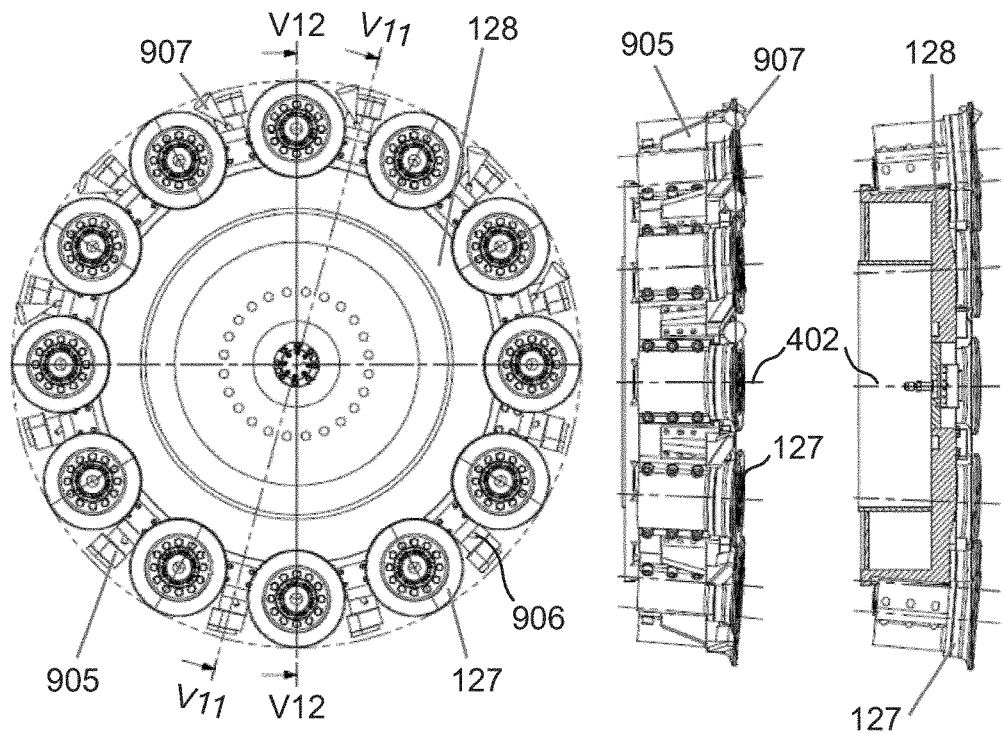
FIG. 10 is a view of a cutting head along the cutting head axis.
FIG. 11 is a side elevation view of the cutting head shown in FIG. 10.
FIG. 12 is a partial cutaway side elevation view of the cutting head shown in FIG. 10.

As it can be seen in FIG. 10, the roller cutters 127 of the cutting head 128 are arranged evenly along the circumference of the cutting head 128, while between each two adjacent roller cutters 127, a scraper element 905 and a nozzle 906 are provided. The nozzle 906 allows for a spray 907 of liquid to be directed to the contact area of the roller cutters 127 with the rock to be cut. In the situation illustrated in FIG. 10, the upper half of the cutting head is in contact with the rock to be cut and thus the nozzles 906 in this area are providing the spray 907, while the nozzles 906 in the lower part are not dispensing liquid.

The view of FIG. 11 is indicated by V11 in FIG. 10, while the view of FIG. 12 is indicated by V12.

Referring to FIGS. 13 and 14, the cutting head 128 includes a manifold 908 connecting a sectorial control 909 with the nozzles for dispensing liquid to the cutting area. The sectorial control 909 is provided with the liquid by a conduit (not shown) within the planetary gear assembly mentioned above, so that the liquid provided to the center of the cutting head (i.e. to the sectorial control 909) is then distributed to the proper nozzles.

Referring to FIGS. 15 and 16, the cutting area 910 is provided with sprayed liquid 907, so to provide for cooling of the equipment upon cutting, for removing fines and for suppressing the release of dust. The cutting area 910 corresponds to the leading edge (or half) of the cutting head, cutting into the rock 911, thereby providing a processed area 912.

Figure 17:
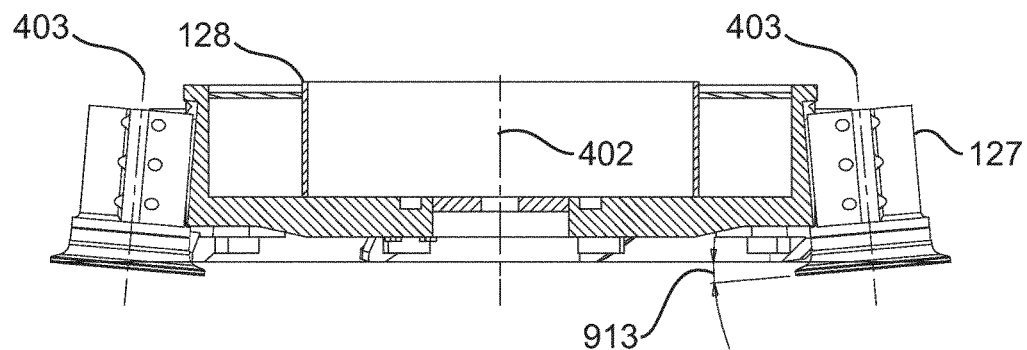
FIG. 17 is a cross sectional view of a cutting head, similar to FIG. 12.

It is illustrated in FIG. 17 that the axes 403 of the roller cutters 127 are inclined (inwards) with respect to the head axis 402 of the cutting head 128 by an angle 913, so that the angle of attack on the rock face is reduced (see FIG. 9 or 15) in comparison to the angle of the cutting head 128 in total to the rock face.

Figure 18:
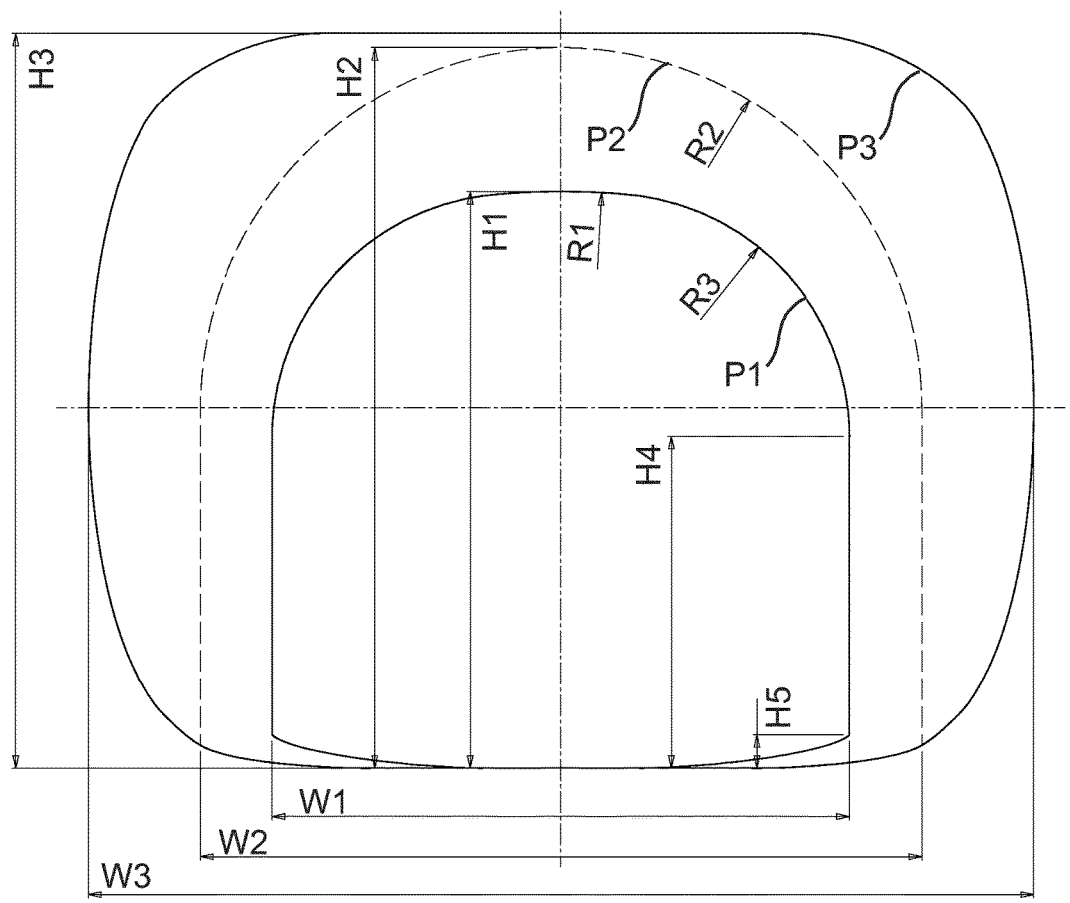
FIG. 18 is a diagram illustrating different profiles of a tunnel cut according to the invention.

In FIG. 18, different profiles or shapes of the tunnel or subterranean roadway achievable by the cutting apparatus and method of operating of the present invention are shown.

A medium profile P2 has a height H2 and a width W2, while the upper portion thereof shows a curve radius R2. A more narrow profile P1 has a height H1 and a width W2, while the upper portion exhibits a range of radii larger than R2, including radius R1 and R3. A broader profile P3 has a height H3 and a width W3. In the narrow profile, a height after which the side wall is basically flat is indicated by H5, while the start of the roof area is indicated by H4.

By means of the present invention, basically any reasonable profile within the envelope provided by profiles P1 and P3 can be provided.

As illustrated in several figures and discussed above, in an exemplary embodiment, the cutting apparatus 100 of the invention comprises two cutting heads 128, each arranged at the end of a cutting arm 121, wherein each cutting head is driven by a cutter gear 124. In particular, the cutting heads 128 are provided for operations like sumping in (cutting) with the cutting heads 128 in the lowest position, by moving the cutting heads 128 straight forward along the tunnel axis, slewing the cutting heads 128 upwards (as a main cutting operation), by rotation of the cutting arm around a slew axis 401 which is horizontal, profiling the roof section of the tunnel cross section, with a motion which can be a combination of above mentioned upwards slew and a slewing motion around a vertical axis 400, and trimming (flattening) of the floor of the tunnel cross section with the cutting head in its lowest position by a slewing motion around a vertical axis 400, Advantageous, in the present context, the main cutting operation is cutting from floor to roof, which provides, for example, as advantages that, by gravity, the cut material drops to the floor and therefore does not (further) interfere with the roller cutters and that, due to the slewing motion upwards of the cutting head 128, the cutting action provides a smooth, circular shaped face and smooth transition from floor to face, providing good material flow.

As discussed above, the cutting head 128 includes a cutting head structure carrying a plurality of exchangeable roller cutters 127. It is preferred that the roller cutters 127 are arranged evenly spaced around the circumference of the base body of the cutting head 128 and that the roller cutters 127 are arranged in a way that, while the cutting head 128 is rotating the cutting edges of the roller cutters are running on the same cutting path. When the cutting head 128 is moved in cutting direction each roller cutter 127 engaging the rock is deepening the cutting groove produced by the roller cutter 127 running in front.

Exchangeable scraper elements 905 between the individual roller cutters can serve to clean the cutting path for the following roller cutter 127.

In case of blocky ground conditions, the scraper elements 905 may be exchanged with bolt-on segments (not shown) between the roller cutters 127, providing closed circular circumference of the cutting head 128, prohibiting rocks being jammed between the roller cutters 127.

In addition to the scraper elements 905, in the illustrated embodiments, water sprays are installed at the cutting head 128. The spray nozzles 906 are preferably arranged between the roller cutters 127 and directed in way that the water (or other liquid) is directed into the cutting groove.

This provides an advantage in cleaning the cutting groove from fines and therefore increasing the cutting performance, in addition the water sprays 907 serves for dust reduction and cooling of the roller cutters 127.

The liquid for the spray nozzles 906 is lead through the cutter gear 124 into a sectorial control 909 and from there through a manifold 908 in the cutting head structure and to the nozzles 906. The sectorial control unit 909 provides water flow only in a specified section of the cutting head 128, providing that water is sprayed only in that section of the cutting head 128 which is engaged with the rock 911. This provides an advantage of reducing the amount water at the cutting face.

The cutting head 128 is mounted on the cutting arm 121 in a way that in the lowest position of the cutting arm 121 the cutting plane of the roller cutters 127 forms an angle 903 with the tunnel floor, as clearance angle during sump in (straight cutting head movement forward).

In addition the rotation axis 402 of the cutting head 128 has an offset 902 from the slewing axis 401 for vertical slew, in order to provide a clearance angle 904 during upwards cutting.

For cutting in lateral direction (e.g. profiling the roof and the floor) the cutting head 128 has a clearance angle 901 between the cutting head rotation axis 402 and the axis 401 for horizontal slewing.

In order to reduce the attack angle between roller cutters 127 and the rock (i.e. in order to provide a better cutting performance) the individual roller cutters 127 are tilted against the cutterhead rotation axis by an angle 913. In order to maintain a clearance angle of the roller cutters' cutting edge plane and the rock, the angle 913 is preferably less than the angle 903, and less or equal than the angle 901.

Figure 19:
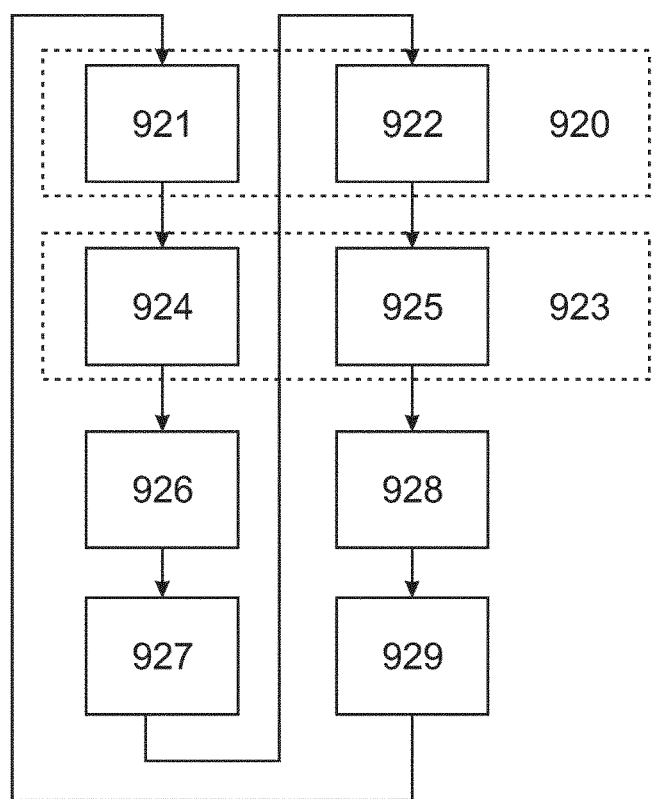
FIG. 19 is a schematic flow diagram illustrating a method according to the invention.

Referring to FIG. 19, in an operation of the cutting apparatus as discussed here, a two cutting heads are moved forward in sump in step 920, where the cutting arm is positioned substantially downwards, so that the cutting head forms an angle with the floor. The forward movement is achieved by movement of the sled discussed above. Depending on the constructional details of the cutting apparatus, the sump in may also be provided separately for each cutting head (steps 921, 922). After sump-in, a cutting step 923 is provided, including pivoting (step 924) the first arm and pivoting (step 925) the second arm while rotating the cutting heads and engaging the rotating cutting heads into the rock face (see FIGS. 15 and 16). Again the cutting steps 924 and 925 may be provided simultaneously or independently from each other. After the main cutting is completed, one of the cutting heads is lowered (step 926) and used for flattening the ground (step 927). The flattening is achieved by moving the cutting head sideways by means of pivoting the support. Due to the pivoting of the support, the areas of operation of cutting heads partially overlap. While the one cutting head is lowered and used for flattening, the other cutting head is operated in a mode for shaping the roof area (step 928), including a combination of an upwards/downwards pivoting of the arm to which the cutting head is mounted and a sideways pivoting of the support, to which the arm is mounted, followed by a lowering of the cutting head (step 929). After this, the process is repeated (as long as further movement forward is allowed by the sled), wherein the roles of the first and second cutting head are exchanged, so to avoid unbalanced stress on the equipment.

Exemplary Embodiments

Embodiment 1. Cutting apparatus (100) suitable for creating tunnels or subterranean roadways and the like comprising:

a main frame (102) having generally upward (300), downward (301) and side (302) facing regions;

a first and second support (120) pivotally mounted relative to the main frame (102) via respective first and second support axes (400) aligned generally upright relative to the upward (300) and downward (301) facing regions such that each first and second support (120) is configured to pivot laterally in a sideways direction relative to the side (302) facing regions;

at least one first and second support actuator (117) to respectively actuate independently movement of each of the first and second supports (120) relative to the main frame (102);

a first and second arm (121) each pivotally mounted to the respective first and second (120) support via a respective arm pivot axis (401) aligned in a direction extending transverse including perpendicular to each support pivot axis (400) to enable the first and second arms (121) to pivot independently of one another and to pivot relative to each of the respective first and second supports (120) in an upward and downward direction relative to the upward (300) and downward (301) facing regions;

at least one first and second arm actuator (122, 130) to actuate independently pivoting movement of the first and second arms (121) relatives to each of the respective first and second support (120);

a rotatable cutting head (128) mounted at each of the first and second arms (121), each head (128) rotatable about a head axis (402) orientated to extend substantially transverse to each respective arm pivot axis (401).

Embodiment 2. The apparatus of embodiment 1 wherein each cutting head comprises a generally annular cutting edge or layered cutting edges to provide an undercutting mode of operation.

Embodiment 3. The apparatus of embodiment 1 or 2 further comprising a plurality of roller cutters (127) independently rotatably mounted at each rotatable cutting head (128).

Embodiment 4. The apparatus of embodiment claim 3 wherein the plurality of roller cutters (127) are generally annular roller cutters each having a generally annular cutting edge or layered cutting edges to provide an undercutting mode of operation.

Embodiment 5. The apparatus of any one of the preceding embodiments wherein each of the first and second arm actuator (122, 130) comprises a planetary gear assembly mounted at the junction at which each arm (121) pivots relative to each support (120).

Embodiment 6. The apparatus of any one of the preceding embodiments wherein at least one of the first and second arm actuator (122, 130) comprises at least one first drive motor to drive the pivoting movement of the first and/or second arm (121) relative to the respective first and second support (120).

Embodiment 7. The apparatus of any one of the preceding embodiments further comprising at least one second drive motor (125) to drive rotation of the cutting head (128) at the first and/or the second arm (121).

Embodiment 8. The apparatus of any one of the preceding embodiments wherein the first and second support actuator (117) comprises a hydraulic linear actuator.

Embodiment 9. The apparatus of any one of the preceding embodiments further comprising a powered sled (104) movably mounted at the main frame (102) to be configured to slide in a forward cutting direction of the apparatus (100) relative to the main frame (102).

Embodiment 10. The apparatus of embodiment 9 wherein each of the first and second cutting head (128) is mounted at the sled (104) via the respective first and second arms (121) and supports (120) so as to be configured to advance in the forward cutting direction.

Embodiment 11. The apparatus of any one of the preceding embodiments wherein:

each of the first and second arms (121) is configured to pivot in the upward and downward direction by up to 180°; and each of the first and second supports (120) is configured to pivot in the lateral sideways direction by up to 90°.

Embodiment 12. The apparatus of any one of the preceding embodiments further comprising tracks (103) or wheels mounted at the main frame (102) to allow the apparatus (100) to move in a forward and rearward direction.

Embodiment 13. The apparatus of any one of the preceding embodiments further comprising floor and roof engaging members (106, 115, 105, 108) mounted at the main frame (102), at least the floor engaging members (106, 115) being extendable and retractable to respectively raise and lower the apparatus (100) in the upward and downward direction.

Embodiment 14. The apparatus of any one of the preceding embodiments further comprising:

a first material discharge conveyor (202) to convey cut material rearwardly from the first and second cutting head (128); and a gathering head (129) to direct cut material onto the conveyor (202), the gathering head (129) positioned rearwardly behind at least one of the first and second cutting heads (128).

Embodiment 15. The apparatus of embodiment 14 further comprising a control unit (101) demountably connectable to the apparatus (100), the control unit (101) comprising operational components (114) to power at least the first and second support (120) and arm actuators (122, 130), the control unit (101) further comprising a second conveyor (112) to receive material from the first conveyor (202) and to discharge the material at a position rearward of the apparatus (100) and the control unit (101).

Embodiment 16. Cutting apparatus (100) suitable for creating tunnels or subterranean roadways and the like comprising:

a main frame (102) having generally upward (300), downward (301) and side (302) facing regions;

a powered sled (104) movably mounted at the main frame (102) to be configured to slide in a forward cutting direction of the apparatus (100) relative to the main frame (102);

a first and second arm (121) pivotally mounted to the sled (104) by respective pivot arm axes (401) aligned in a direction extending transverse including perpendicular to a longitudinal axis of the main frame (102) to allow each arm (121) to pivot independently of one another in an upward and downward direction relative to the upward and downward facing region of the main frame (102);

at least one first and second arm actuator (122, 130) to actuate independent pivoting movement of the first and second arms (121) relative to one another and the main frame (102);

a rotatable cutting head (128) mounted at each of the first and second arms (121) so as to be configured to be moved in the upward and downward direction and advanced in the forward cutting direction, each head (128) rotatable about a head axis (402) orientated to extend substantially transverse to respective pivot arm axes (401).

Embodiment 17. The apparatus of embodiment 16 wherein each first and second arm (121) together with the respective pivot arm axes is respectively mounted to the sled (104) via a first and second support (120) that is slidably mounted relative to the sled (104) via a common or respective slidable means such that each first and second support (120) is configured to slide laterally in a sideways direction relative to the side facing regions (302).

Embodiment 18. The apparatus of embodiment 16 or 17 wherein each rotatable cutting head (128) comprises a generally annular roller cutter each having a generally annular cutting edge or layered cutting edges to provide an undercutting mode of operation.

Embodiment 19. The apparatus of any one of embodiments 16 to 18 further comprising a plurality of roller cutters (127) independently rotatably mounted at each rotatable cutting head (128).

Embodiment 20. The apparatus of embodiment 19 wherein the plurality of roller cutters (127) are generally annular roller cutters each having a generally annular cutting edge or layered cutting edges to provide an undercutting mode of operation.

Embodiment 21. The apparatus of any one of embodiments 17 to 20 wherein each of the first and second arm actuator (122, 130) comprises a planetary gear assembly mounted at the junction at which each arm (121) pivots relative to each support.

The features of the embodiments presented hereinabove are understood to be, alone or in combination with each other, preferred embodiments of the invention in themselves as well as in combination with what is claimed hereinafter.

The invention claimed is:

1. A cutting apparatus suitable for creating tunnels or subterranean roadways and the like comprising:
   a main frame having a front end and a back end and a plurality of regions facing in a first direction, a second direction opposite to the first direction and a third direction perpendicular to the first and second direction and to a lengthwise direction;
   a first and a second arm each pivotally mounted via a respective arm pivot axis aligned in a direction extending transverse including perpendicular to the first and second direction to enable the first and second arms to pivot independently of one another in the first and second direction;
   at least one first and second arm actuator to actuate independently pivoting movement of the first and second arms relative to the main frame; and
   a rotatable cutting head mounted at each of the first and second arms, wherein each of the rotatable cutting heads is rotatable about a respective head axis orientated to extend substantially transverse to each respective arm pivot axis, the head axis being offset by a predetermined offset amount from a plane defined by the arm pivot axis and a line parallel to the head axis, and wherein the head axis is offset towards a forward cutting direction of the apparatus relative to the main frame with the arm being positioned in the second direction.

2. The cutting apparatus according to claim 1, further comprising:
   a first and second support pivotally mounted relative to the main frame via respective first and second support axes aligned generally along the first and second direction such that each first and second support is configured to pivot laterally in the third direction; and
   at least one first and second support actuator to respectively actuate independently movement of each of the first and second supports relative to the main frame, wherein the first and second arms are mounted to enable the first and second arms to pivot relative to each of the respective first and second supports, and wherein the at least one first and second arm actuator is arranged to actuate independently pivoting movement of the first and second arms relative to each of the respective first and second support.

3. The cutting apparatus according to claim 1, further comprising a powered sled movably mounted at the main frame and configured to slide in the forward cutting direction, wherein the first and second arms are pivotally mounted to the sled and the rotatable cutting head is configured to be moved in the first and second direction and advanced in the forward cutting direction.

4. The cutting apparatus according to claim 3, wherein each first and second arm together with the respective pivot arm axes is respectively mounted to the sled via a first and second support that is movably mounted relative to the sled via a common or respective device such that each first and second support is configured to move laterally in the third direction.

5. The cutting apparatus according to claim 1, wherein each cutting head includes a generally annular cutting edge to provide an undercutting mode of operation.

6. The cutting apparatus according to claim 5, further comprising a plurality of roller cutters independently rotatably mounted at each rotatable cutting head.

7. The cutting apparatus according to claim 6, wherein the plurality of roller cutters are generally annular roller cutters each having a generally annular cutting edge to provide an undercutting mode of operation.

8. The cutting apparatus according to claim 1, wherein the cutting apparatus is arranged for a sump-in-position in which each rotatable cutting head is tilted in the forward cutting direction by a sump-in-angle with respect to a rock face for sump-in.

9. The cutting apparatus according to claim 1, wherein each rotatable cutting head includes a plurality of roller cutters, wherein cutter axes of the roller cutters are inclined in an inward direction opposite the forward cutting direction so that an angle of attack of a cutting roller cutter is smaller than an angle between a plane defined by a respective cutting head and rock to be cut.

10. The cutting apparatus according to claim 1, wherein each of the rotatable cutting heads mounted to the first and second arms is rotatable about a respective head axis orientated to extend substantially transverse to each respective arm pivot axis, the head axis being inclined with respect to a plane perpendicular to the arm pivot axis of the arm.

11. The cutting apparatus according to claim 1, wherein each rotatable cutting head includes a plurality of roller cutters arranged such that cutting edges of the roller cutters follow a common cutting path.

12. The cutting apparatus according to claim 1, wherein each rotatable cutting head includes a plurality of spaced, adjacent roller cutters and wherein between adjacent roller cutters of each rotatable cutting head, respectively, at least one of, a scraper element and a separation element is provided, and wherein the scraper element is arranged to remove cut material from a cutting path and wherein the separation element provides a closed circumference of the cutter head.

13. The cutting apparatus according to claim 1, each cutting head further comprising a plurality of spray nozzles arranged for spraying a liquid towards a cutting path of the cutting head.

14. A method of operating a cutting apparatus for creating tunnels or subterranean roadways and the like, comprising the steps of:
   providing a cutting apparatus, the cutting apparatus including a main frame having a front end and a back end and a plurality of regions generally facing in a first direction, a second direction opposite to the first direction and a third direction perpendicular to the first and second direction and to a lengthwise direction, a first and a second arm each pivotally mounted via a respective arm pivot axis aligned in a direction extending transverse including perpendicular to a first and second direction to enable the first and second arms to pivot independently of one another in the first and second directions, at least one first and second arm actuator to actuate independently pivoting movement of the first and second arms relative to the main frame, and a rotatable cutting head mounted at each of the first and second arms, wherein each of the rotatable cutting heads is rotatable about a respective head axis orientated to extend substantially transverse to each respective arm pivot axis, the head axis being offset by a predetermined offset amount from a plane defined by the arm pivot axis and a line parallel to the head axis, and wherein the head axis is offset towards a forward cutting direction of the apparatus relative to the main frame with the arm being positioned in the second direction;

a positioning step of pivoting the first and second arm in the second direction such that each cutting head is tilted forward by a sump-in-angle with respect to a sump-in plane with a forwardmost edge towards the forward cutting direction of the cutting head being further in the second direction than its rearwardmost edge opposite the forward cutting direction; and a cutting step including pivoting the first arm and pivoting the second arm while rotating the cutting head and engaging the rotating cutting head into a rock face.

* * * * *